United States Patent [19]

Guest

[11] Patent Number: 5,401,064
[45] Date of Patent: Mar. 28, 1995

[54] TUBE COUPLINGS FOR CO-AXIAL TUBING

[76] Inventor: John D. Guest, "Iona", Cannon Hill Way, Bray, Maidenhead, Berks, United Kingdom

[21] Appl. No.: 305,409

[22] Filed: Sep. 13, 1994

Related U.S. Application Data

[63] Continuation of Ser. No. 968,968, Oct. 30, 1992, abandoned.

[30] Foreign Application Priority Data

Nov. 1, 1991 [GB] United Kingdom ............... 9123239

[51] Int. Cl.⁶ ............................................. F16L 39/00
[52] U.S. Cl. ................................ 285/133.1; 285/132; 285/138
[58] Field of Search ................. 285/131, 132, 133.1, 285/138, 323

[56] References Cited

U.S. PATENT DOCUMENTS

| | | | |
|---|---|---|---|
| 3,909,046 | 9/1975 | Legris | 285/323 |
| 4,281,681 | 8/1981 | Teague, Jr. | 137/562 |
| 4,890,865 | 1/1990 | Hosono et al. | 285/133.1 |

FOREIGN PATENT DOCUMENTS

| | | | |
|---|---|---|---|
| 8533721.8 | 5/1988 | Germany . | |
| 3703841 | 8/1988 | Germany . | |
| 9015089.9 | 2/1991 | Germany . | |
| 566770 | 1/1945 | United Kingdom . | |
| 1360732 | 7/1974 | United Kingdom . | |
| 1520742 | 8/1978 | United Kingdom . | |
| 2098688 | 11/1982 | United Kingdom | 285/138 |
| 0268251 | 5/1988 | United Kingdom . | |
| 2211506 | 7/1989 | United Kingdom | 285/323 |

*Primary Examiner*—P. Austin Bradley
*Assistant Examiner*—Jeffrey T. Knapp
*Attorney, Agent, or Firm*—Baker & Daniels

[57] ABSTRACT

A tube coupling for co-axial tubing includes a body having a throughway open at one end to receive an end portion of a length of co-axial tubing. The throughway has an annular seat spaced from the open end to receive the outer tube of the co-axial tubing and a tube locking means disposed between the seat and the open end to receive and lock the tubing in the throughway. A conduit is mounted concentrically in the throughway and is connected integrally with the coupling body to receive an inner tube of the co-axial tubing to provide a separate passageway extending concentrically within the throughway.

13 Claims, 10 Drawing Sheets

TUBE COUPLINGS FOR CO-AXIAL TUBING

This is a continuation of application Ser. No. 07/968,968, filed Oct. 30, 1992, now abandoned.

BACKGROUNG TO THE INVENTION

1. Field of the Invention

The invention relates to tube couplings for co-axial tubing, that is tubing having inner and outer tubes disposed concentrically, one within the other.

2. Background Prior Art

EP-A-0268251 discloses a tube joint for connecting a multi-walled tube assembly, typically a double-walled tube assembly, including a joint body having a hole for inserting the tube assembly and as many passages as the number of fluid passages. A tube connector mechanism is provided for engaging the tube assembly. A coupling has a rod for being fitted into the tube assembly and a passage for communicating the tube assembly with one of the passages of the joint body. The body is formed with parallel side-by-side passages one of which communicates through the rod with the inner tube of the assembly and another of which communicates through a radial hole in the body with an outer passage of the tube assembly.

SUMMARY OF THE INVENTION

The invention provides a tube coupling for co-axial tubing comprising a body having a throughway open at one end to receive an end portion of a length of co-axial tubing, the throughway having an annular seat spaced from said open end to receive the outer tube of the co-axial tubing, a tube locking means disposed between the seat and said open end to receive and lock the tubing in the throughway and a conduit mounted concentrically in the throughway and connected integrally with the coupling body to receive an inner tube of said co-axial tubing to provide a separate passageway extending concentrically within the throughway.

In one arrangement according to the invention the conduit may be mounted on a radially extending web or webs in the throughway to locate the conduit concentrically with the throughway whilst not significantly obstructing flow along the throughway.

The body may be formed with a throughway having a plurality of intersecting branches each of which is open at one end to receive an end portion of a length of co-axial tube, each branch having an annular seat spaced from said open end to receive the outer part of the co-axial tube and tube locking means disposed between the seat and the open end to lock the tube in the seat, the body also having an inner conduit formed with a corresponding plurality of intersecting branches extending into the branches of the throughway for connection to the inner tubes of the co-axial tube.

By way of example the body may have a throughway formed with two branches.

More particularly the branches of the throughway may be in axial alignment to form "in-line" connector between the co-axial tubes.

Alternatively the branches of the throughway may lie at right angles to one another to form an "elbow" connection between the co-axial tubes.

In a further construction the body may have three branch passages arranged in "T-formation" to receive three co-axial tubes.

In a still further arrangement the throughway in the body may have three branches in the form of a T- and an inner conduit in the form of an elbow extending between branches forming one arm and one leg of the T, the inner conduit opening into the branch of the T forming said leg of the T and the other arm of the T communicating directly with the outer portion of the one arm, whereby a co-axial tube connected to said one arm communicates with plain tubes connected respectively to the leg and other arm of the T.

In any of the above arrangements the or each conduit may be adapted to engage in the inner tube of the co-axial tubing and the end of the inner conduit may be formed with an integral encircling sealing lip or lips to seal with the inner surface of the inner tube.

DESCRIPTION OF THE PREFERRED EMBODIMENTS

Figure 1:
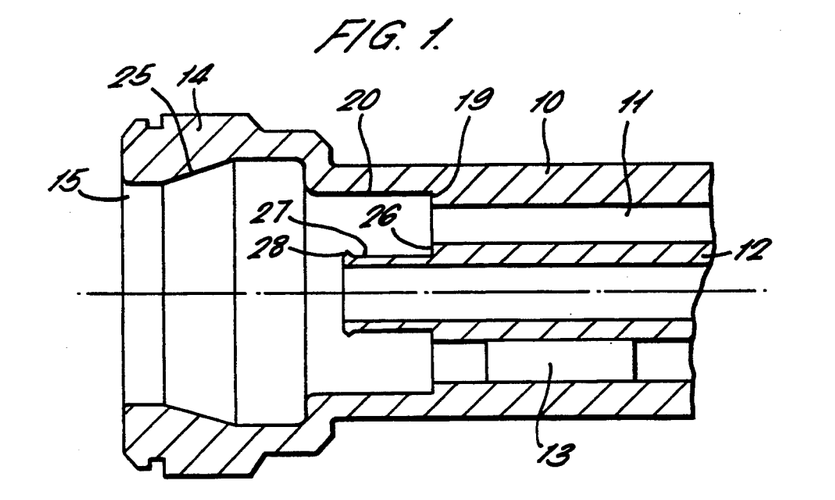
FIG. 1 is a cross-sectional view through part of a single tube coupling for a co-axial tube.

Referring firstly to FIG. 1 of the drawings there is shown part of a single tube coupling body 10 of generally cylindrical form having an inner throughway 11 in which an inner conduit 12 is mounted concentrically by means of one or more radial webs, one of which is indicated at 13, formed integrally with the conduit and coupling body. The coupling body is formed with an enlarged end portion 14 terminating in an open end 15.

Figure 2:
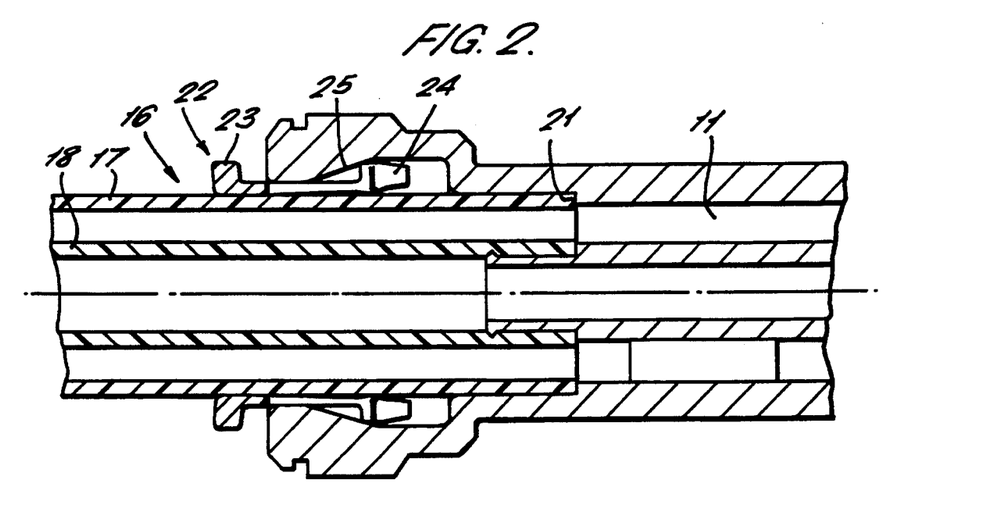
FIG. 2 is a similar view to that of FIG. 1 showing an end part of a length of co-axial tubing secured in the coupling with a collet form locking device.

Referring to FIG. 2 of the drawings, an end part of a length of co-axial flexible wall tubing indicated generally at 16 is shown inserted into the coupling body. The tubing comprises an outer tube 17 and an inner concentrically disposed tube 18 spaced from the outer tube by integral radial webs extending between the inner and outer tubes. It will be appreciated that other forms of co-axial tubing may be used and is not restricted to any particular tubing construction.

The throughway 11 is formed at a location spaced from the open end 15 with a shallow radial step 19 facing towards the open end to form an enlarged diameter throughway portion 20 connecting to the enlarged end portion 14 of the coupling body. The outer tube 17 of the co-axial tubing is a close fit in the enlarged throughway portion 20 and the end 21 of the tube abuts the step 19 when the tube is inserted in the coupling body as shown in FIG. 2.

To hold the tube in the coupling body a collet of the type described and illustrated in our U.K. Patent Nos. 1520742 and 1573757 is located in the enlarged end portion 14 of the coupling body. The collet is illustrated generally at 22 on FIG. 2 and comprises an annular head 23 disposed outside the coupling body having a ring of axially extending resilient fingers 23 projecting into the open end of the coupling body and terminating in heads 24. The enlarged end portion of the coupling body is formed with an internal tapered cam surface 25 reducing towards the open end 15 of the coupling body and with which the heads 24 of the resilient fingers are engageable as shown in FIG. 2. The outer tube is locked in the coupling body by inserting the tube into the coupling body and then withdrawing the collet 22 slightly to engage the heads 24 of the collet between the tapered cam 25 and outer surface of the tube. Any tendancy of the tube to move out of the coupling body draws the collet with it and thereby draws the heads 24 of the collet further down the tapered cam surface 25 thereby increasing the grip of the collet on the tube and increasing the resistance to extraction of the tube and collet.

The inner conduit 12 projects beyond the step 19 encircling the outer wall of the throughway and is itself formed with a step 26 in line with step 19 to form a reduced outer diameter portion 27 projecting towards the open end of the conduit to engage with a close fit in the inner tube 18 of the co-axial tubing. The step 26 provides an end stop against which the end of the inner tube 18 engages. The end portion 27 of the conduit 12 is formed with a raised lip 28 around the periphery of its end to engage the tube 18 and provide a seal.

Figure 3:
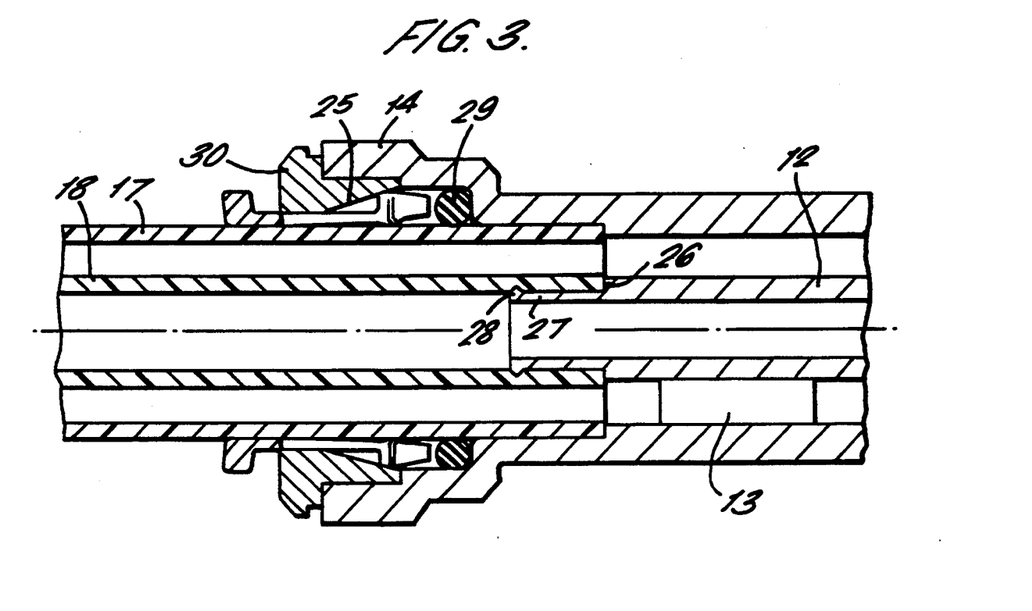
FIG. 3 is a similar view to FIG. 2 for the separate seal provided in the coupling body for the outer tube of the coaxial tubing.

The coupling body thus provides an outer throughway and an inner conduit for connection respectively to the inner and outer tubes of a co-axial tubing engaged in the coupling body with the inner tube 18 sealed to the conduit 12 by the lip 28 and the outer tube 17 sealed in the throughway by means of the close fit with the bore 20 of the throughway. The seal between the outer and the coupling body can be enhanced by means of a conventional O-ring seal 29 disposed in the enlarged end part of the body next to the collet as shown in FIG. 3. A further feature is shown in FIG. 3 in which the tapered cam surface 25 in the enlarged end part of the coupling body is formed in a separate insert 30 secured in the enlarged part 14 of the coupling body as described in our U.K. Patent No. 2120339.

Thus the arrangement provides a connection for a co-axial tube coupling which preserves the separate flows in the outer and inner parts of the coaxial tubing respectively through the coupling body.

Figure 4:
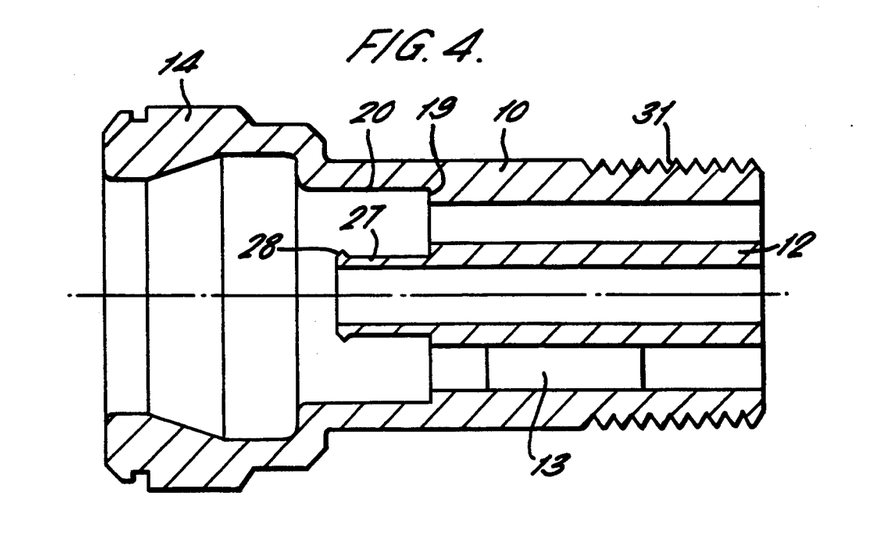
FIG. 4 is a similar view to FIG. 1 showing a version of the coupling body adapted for securing in a screw threaded bore.

FIGS. 1 to 3 of the drawings show part of a coupling body in which the invention is applied. FIG. 4 of the drawings shows the application of the invention to a coupling body having a single connection to a co-axial tube, the coupling body being intended to be mounted in a screw threaded bore in another component and, to that end, being formed with an external screw thread 31.

Figure 5:
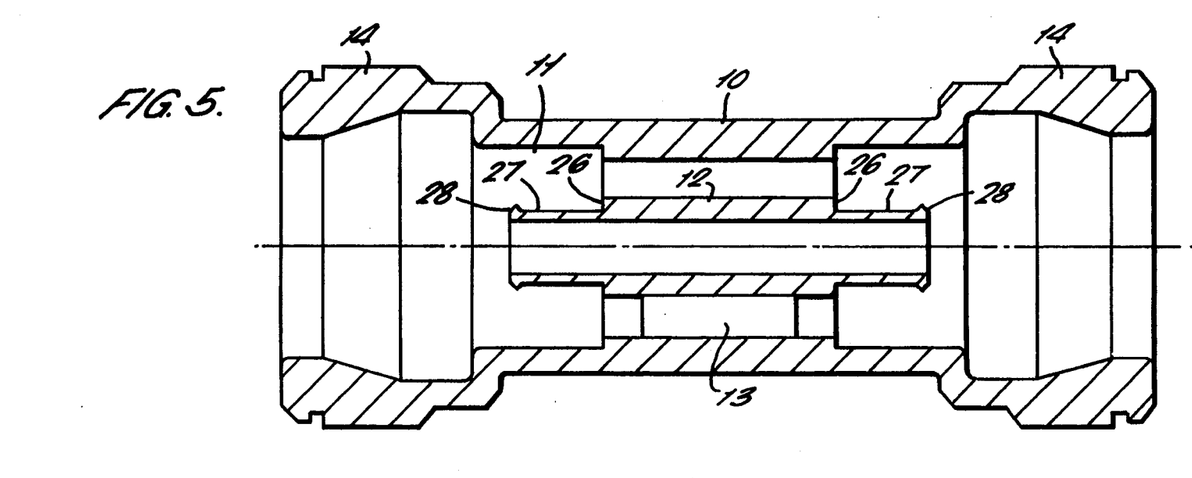
FIG. 5 is a cross-sectional view through an "in-line" coupling body for coupling two lengths of co-axial tubes.
Figure 6:
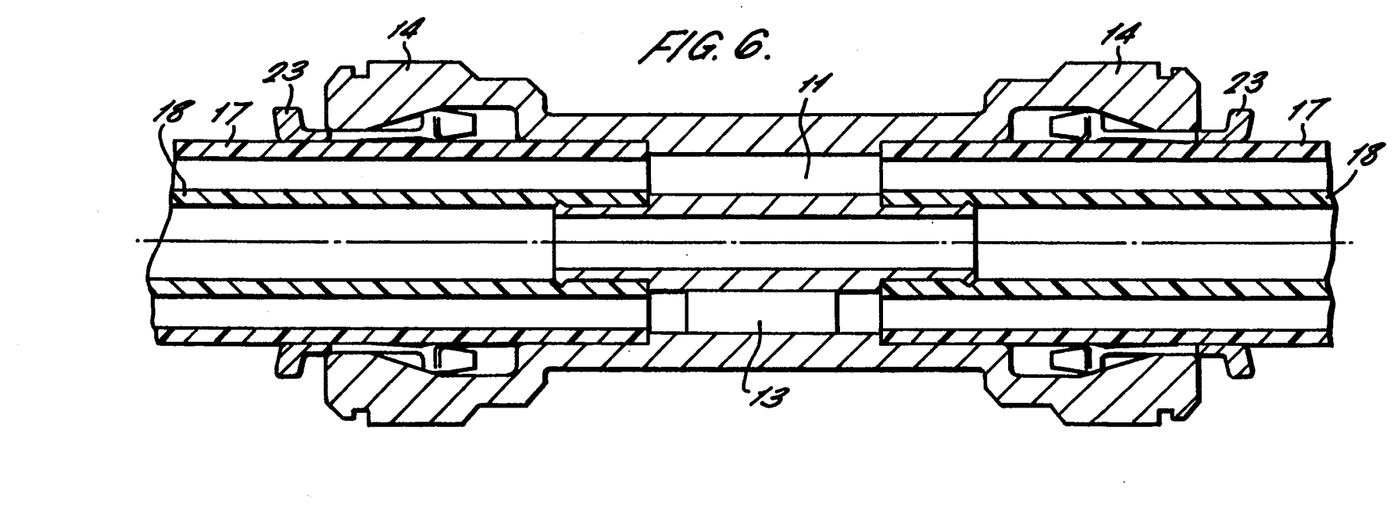
FIG. 6 shows the coupling body of FIG. 5 with two tubes connected to the coupling body.

FIGS. 5 and 6 illustrate the application of the invention to a "double-ended" "in-line" coupler for connecting lengths of co-axial tubing together.

Figure 7:
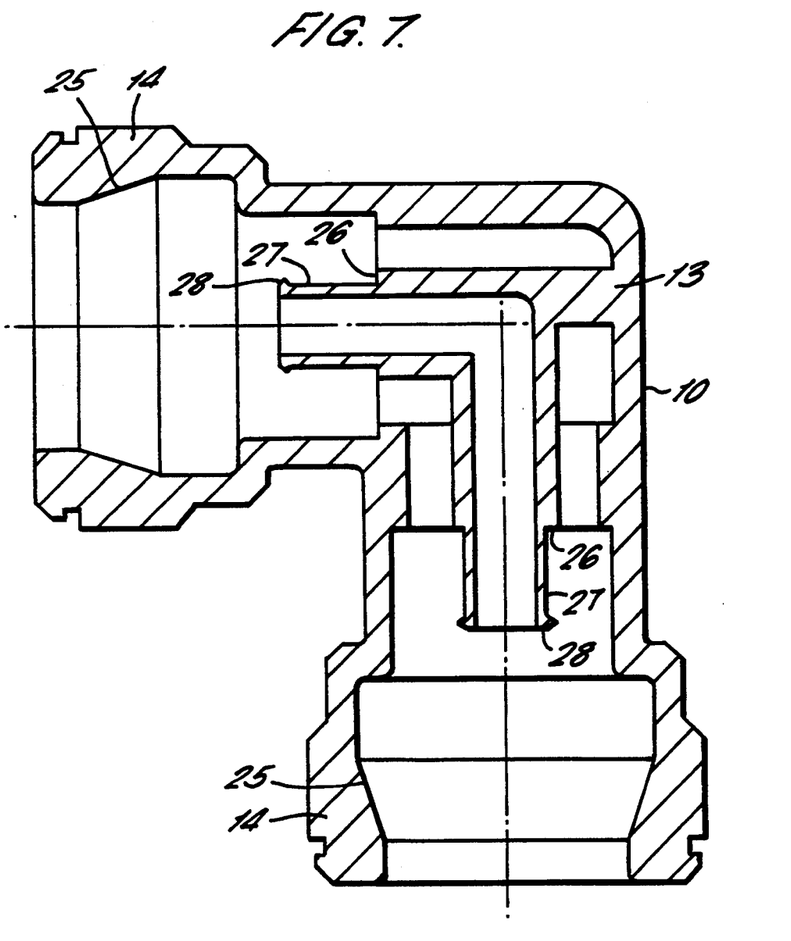
FIG. 7 is across-sectional view through an "elbow" form of coupling body for coupling two lengths of co-axial tubing.
Figure 8:
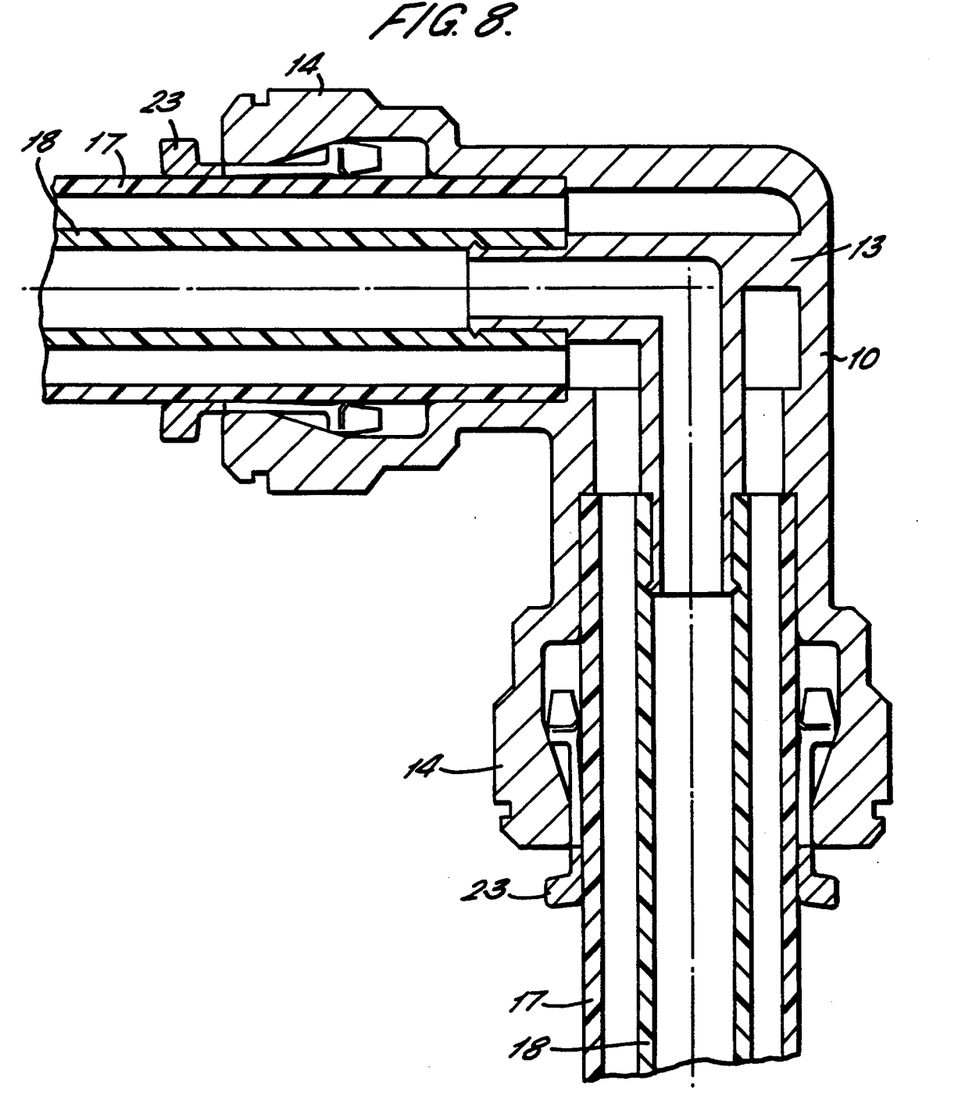
FIG. 8 shows the coupling body of FIG. 7 with two lengths of co-axial tubing coupled together by the body.

FIGS. 7 and 8 illustrate the application of the invention to a double-ended "elbow" form coupler again for connecting two lengths of co-axial tubing together.

Figure 9:
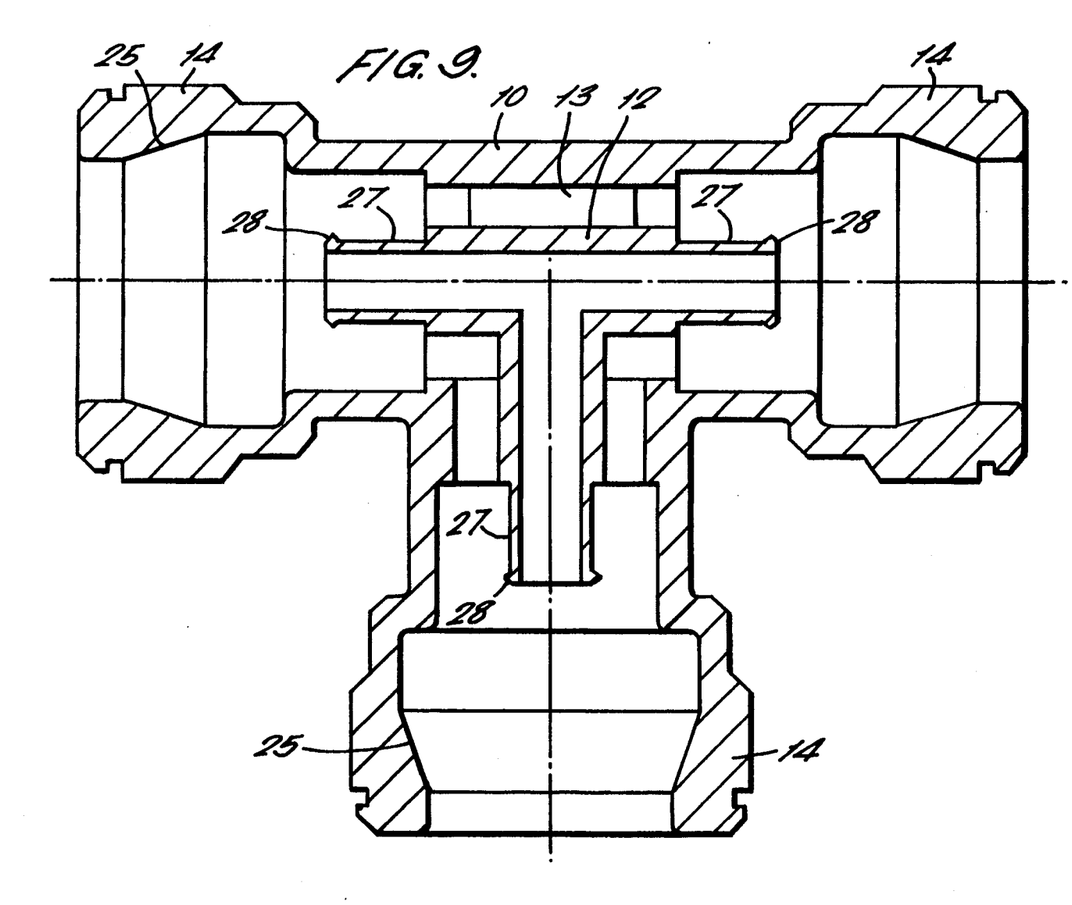
FIG. 9 is a cross-sectional view through a "T-form" coupling providing connections for three lengths of co-axial tubing.
Figure 10:
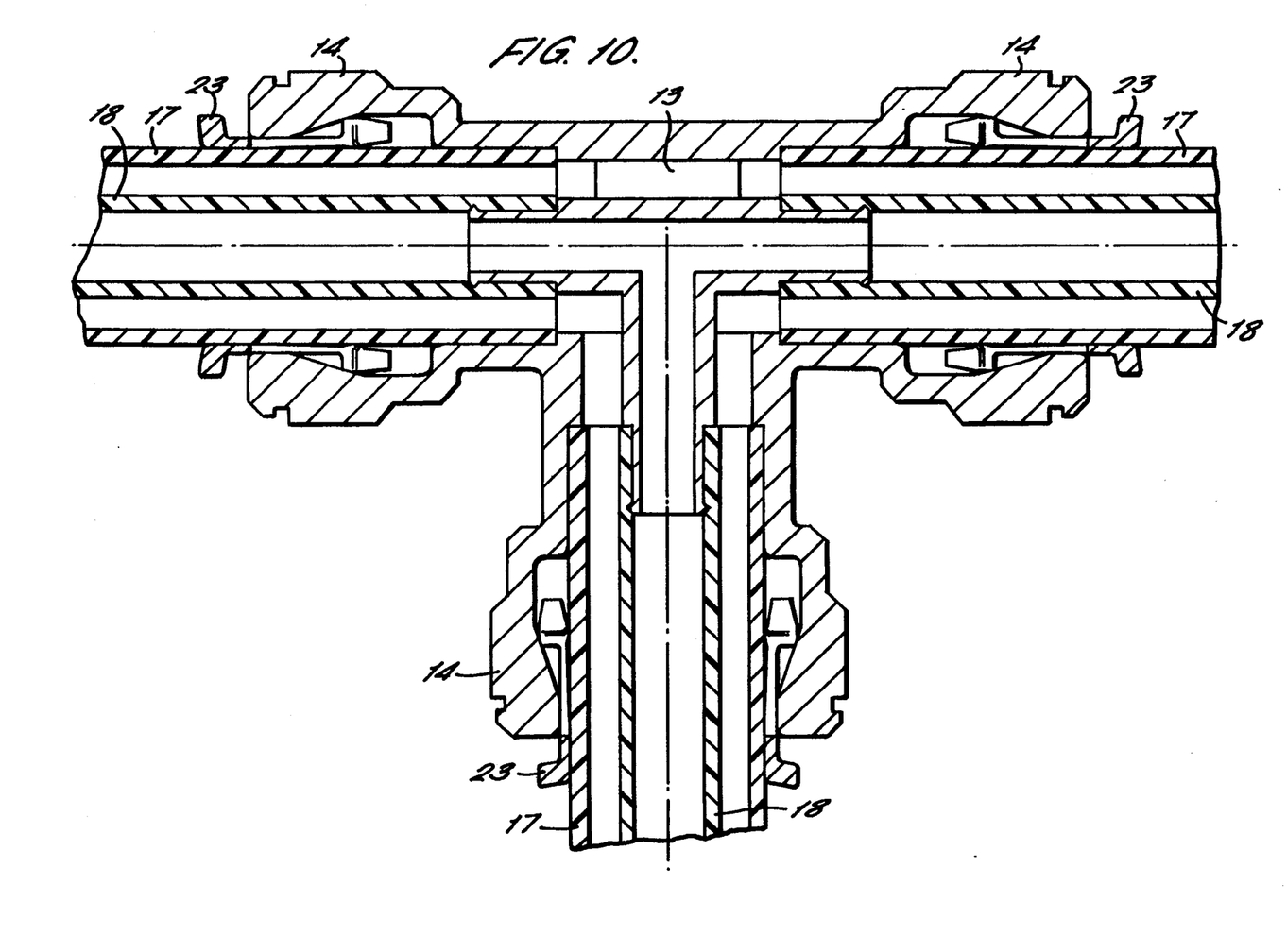
FIG. 10 is a view of the coupling body of FIG. 9 with three lengths of co-axial tubing connected thereto.

FIGS. 9 and 10 illustrate the application of the invention to a "T-form" coupler for connecting lengths of three co-axial tubing together.

Figure 11:
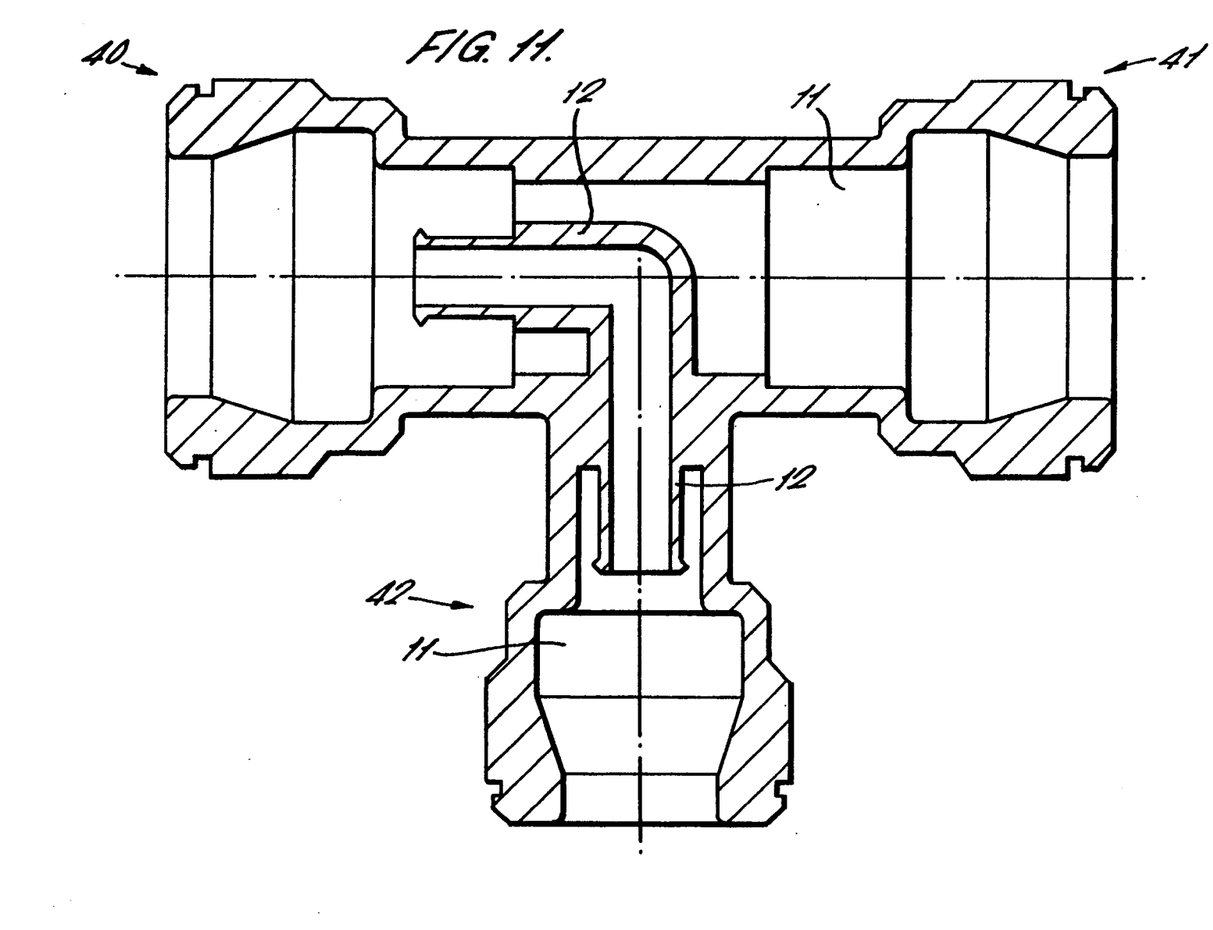
FIG. 11 is a cross-sectional view through a modified form of the T-form coupling body of FIG. 9.

FIG. 11 shows a variation on the T-form coupling in which the T has arms indicated generally at 40 and 41 and a leg 42. One of the arms 40 is formed as before with an inner conduit 11 to receive a length of co-axial tubing as described before. In this case however the inner conduit 11 is of elbow form and is turned into the leg 42 leaving only the throughway 11 extending through the other arm 41 in which a single tube is inserted and coupled in a similar manner to that described above for the outer tube of the co-axial tubing.

Figure 12:
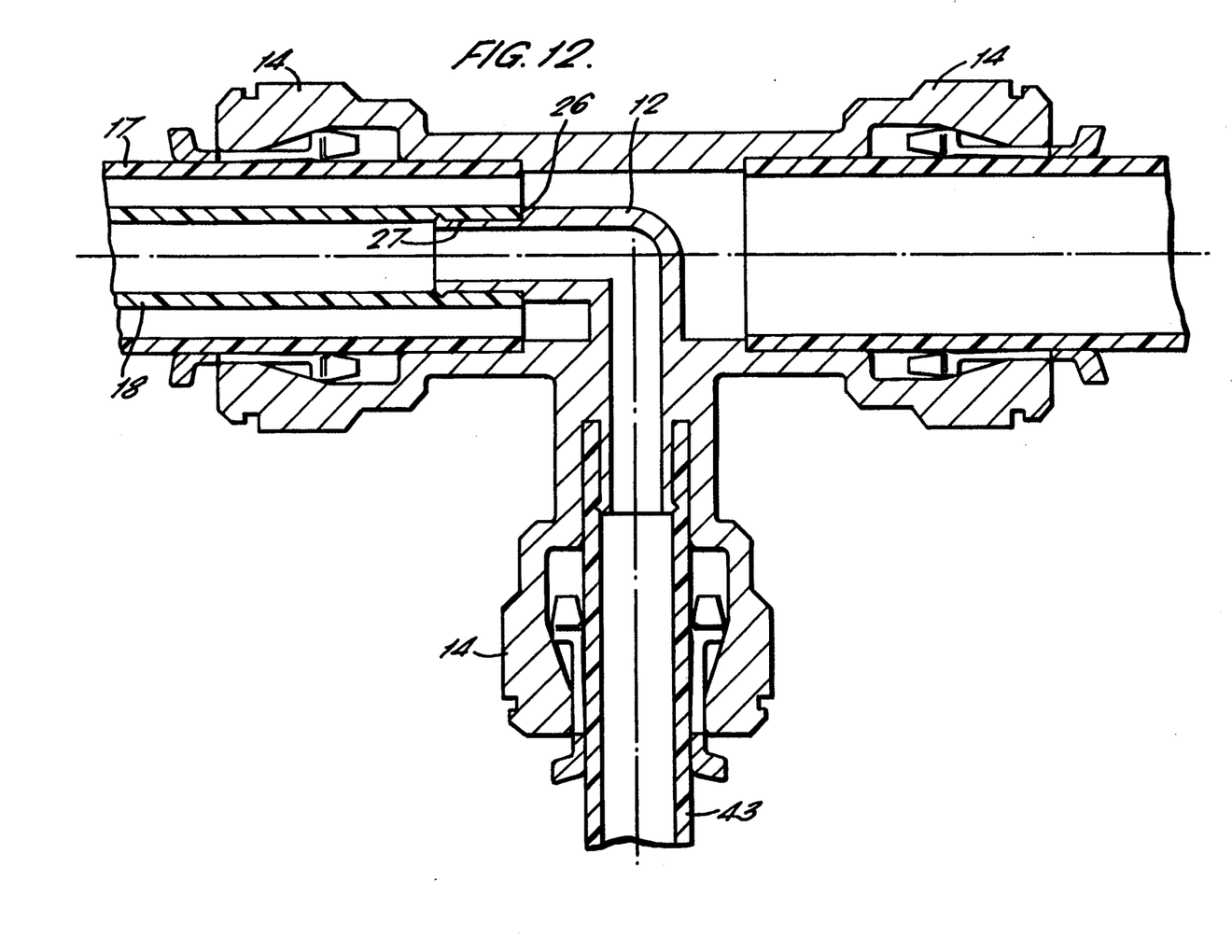
FIG. 12 shows the coupling body of FIG. 11 with three tubes connected thereto.

The throughway 11 of the leg part of the coupling is closed off from the throughway extended between the arms of the T-form and the conduit 12 receives a further single tube indicated at 43 in FIG. 12 which is secured in the coupling body by a collet arrangement as described before. Thus, the coupling provides two separate tube connections to a co-axial tube.

Figure 13:
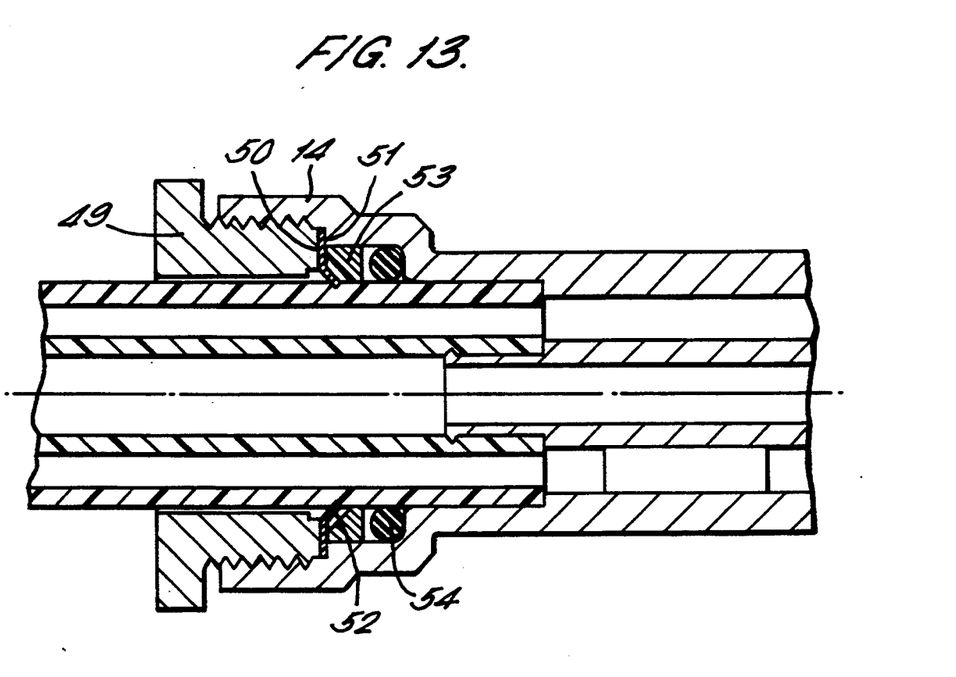
FIG. 13 is a view of a further form of single coupling body with another form of locking device securing the co-axial tube therein.

Finally, FIG. 13 of the drawings shows alternative means for locking the tube in the enlarged part 14 of the coupling body using a spring washer 50 mounted around its outer periphery in an annular recess 51 in the inner wall of the enlarged part 14 of the coupling body and held in place by a sleeve 51 screwed into the open end of the coupling body. The spring washer has a series of resilient legs 52 around its inner periphery angled away from the open end of the coupling body to engage the surface of the outer tube of a length of tubing as it is inserted into the coupling body allowing the tubing to be inserted but resisting withdrawal of the tubing. A bevelled spacer 53 is located next to the washer and the O-ring seal 54 is disposed between the washer and end of the enlarged part of the coupling body.

The arrangements of the invention thus provide convenient connections for co-axial tubing. Reference should also be made to my U.S. patent application No. 897658, abandoned and continued as 08/227,562, in which further details of sealing arrangements in coupling bodies for tubes are described together with methods of manufacturing coupling bodies which are applicable to the present invention.

I claim:

1. A tube coupling for co-axial tubing comprising a body having a throughway open at one end for receiving an end portion of a length of co-axial tubing, the throughway having an internal annular seat spaced from said open end to receive the outer tube of the co-axial tubing, a tube locking means disposed between the seat and said open end to receive and lock the tubing in the throughway, an annular seal disposed between the seat and locking means to seal with the outer surface of said tubing and said body, a conduit extending along the throughway and a single radial web formed integrally with and extending between the conduit and body to mount the conduit concentrically in the throughway and to define inner and outer concentric passageways extending through the body for communication with the inner and outer tubes respectively, one end of the conduit having an encircling recess to receive an inner tube of said co-axial tubing and an annular encircling seal located in the recess to seal with said tube.

2. A tube coupling as claimed in claim 1, wherein the throughway in the body has three branches in the form of a T and an inner conduit in the form of an elbow extending between two of said three branches of the T, one of said two branches adapted to receive a co-axial tube and the other of said two branches adapted to receive a single tube.

3. A tube coupling as claimed in claim 1, wherein further sealing means is provided in the throughway to seal with the outer tube of the co-axial tubing and prevent loss of fluid therefrom.

4. A tube coupling as claimed in claim 3, wherein the further sealing means comprises an O-ring seal disposed in a recess in the throughway between the annular seal and locking means to engage and seal with the outer surface of the outer tube of said co-axial tubing.

5. A tube coupling as claimed in claim 1, wherein sealing means are provided in the throughway to seal the inner tube of the co-axial tubing and the conduit against communication with the existing throughway.

6. A tube coupling as claimed in claim 5, wherein the sealing means is located on the conduit to engage with the inner tube of the co-axial tubing.

7. A tube coupling as claimed in claim 6, wherein the sealing means is provided at the open end of the inner conduit.

8. A tube coupling as claimed in claim 7, wherein the sealing means comprises an integral lip or lips formed on the open end of the inner conduit, the lip or lips being out-turned for a tube to engage over the conduit or in-turned for a tube to engage in the conduit.

9. A tube coupling as claimed in claim 1, wherein the body is formed with the throughway having a plurality of intersecting branches each of which is open at one end to receive an end portion of a length of co-axial tube, each branch having an annular seat spaced from said open end to receive the outer part of the co-axial tube and tube locking means disposed between the seat and the open end to lock the tube in the seat, the body also having an inner conduit formed with a corresponding plurality of intersecting branches extending into the branches of the throughway for connection to the inner tubes of the co-axial tube.

10. A tube coupling as claimed in claim 9, wherein the body has a throughway formed with two branches.

11. A tube coupling as claimed in claim 10, wherein the branches of the throughway are in axial alignment to form an in-line connector between the co-axial tubes.

12. A tube coupling as claimed in claim 10, wherein the branches of the throughway lie at right angles to one another to form an elbow connection between the co-axial tubes.

13. A tube coupling as claimed in claim 10, wherein the body has three branch passages arranged in T-formation to receive three co-axial tubes.

* * * * *